United States Patent
Kaneko

(10) Patent No.: US 8,352,571 B2
(45) Date of Patent: *Jan. 8, 2013

(54) APPARATUS AND METHOD FOR DATA TRANSMISSION

(75) Inventor: Michio Kaneko, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 12/551,342

(22) Filed: Aug. 31, 2009

(65) Prior Publication Data

US 2009/0316726 A1 Dec. 24, 2009

Related U.S. Application Data

(63) Continuation of application No. 11/102,870, filed on Apr. 11, 2005, now Pat. No. 7,613,788, which is a continuation of application No. 09/576,324, filed on May 22, 2000, now Pat. No. 6,940,812.

(30) Foreign Application Priority Data

May 26, 1999 (JP) .................................. 11-146456

(51) Int. Cl.
*G06F 15/16* (2006.01)

(52) U.S. Cl. ........ 709/217; 709/227; 370/230; 370/235; 370/468

(58) Field of Classification Search .......... 709/217–219, 709/225–228; 370/229–235, 468
See application file for complete search history.

(56) References Cited

U.S. PATENT DOCUMENTS 5,241,542 A * 8/1993 Natarajan et al. ............. 370/311
5,430,843 A * 7/1995 Sato et al. ..................... 709/225

(Continued)

FOREIGN PATENT DOCUMENTS

JP 8-87479 4/1996

(Continued)

OTHER PUBLICATIONS

H. Fujiya et al.; "AAL Multiple Processing Technologies for Multi-Rate CBR Connections", Transactions of the Institute of Electronics, Information and Communication Engineers, vol. J79B-I, No. 2; Feb. 1996; pp. 31-40 and English Abstract.

(Continued)

*Primary Examiner* — Bharat N Barot
(74) *Attorney, Agent, or Firm* — Harrity & Harrity, LLP

(57) ABSTRACT

Local concentration of accessing loads on a data buffer during data cell reading is reduced. Also, by providing sufficient time for a data cell reading operation with respect to data cell transmission timing, transmission rate fluctuation of CBR data cells in a transmitting side is reduced. When transmission of a new data stream is added, controller in a cell control unit refers to a transmitted data cell count of VC information processed through a slot immediately before. The controller determines whether a data cell transmitted through the slot immediately before is a head portion of a packet or not. If the data cell transmitted through the slot immediately before is the head portion of the packet, the controller only adds the VC information of the data stream to a shaper link list, and withholds transmission of the data cell. On the other hand, if the data cell transmitted through the slot immediately before is not the head portion of the packet, then the controller adds the VC information of the data stream, and transmits the data cell.

18 Claims, 11 Drawing Sheets

U.S. PATENT DOCUMENTS

| | | | |
|---|---|---|---|
| 5,570,355 A | 10/1996 | Dail et al. | |
| 5,875,174 A * | 2/1999 | Okazaki | 370/230 |
| 6,389,476 B1 * | 5/2002 | Olnowich | 370/468 |
| 6,414,961 B1 | 7/2002 | Katayanagi | |
| 6,480,468 B1 | 11/2002 | Kishigami et al. | |
| 6,483,839 B1 | 11/2002 | Gemar et al. | |
| 6,532,213 B1 | 3/2003 | Chiussi et al. | |
| 6,574,220 B1 | 6/2003 | Petty | |
| 6,661,801 B1 | 12/2003 | Richards et al. | |
| 6,681,274 B2 | 1/2004 | Ennis | |
| 6,721,816 B1 | 4/2004 | Magro et al. | |
| 6,760,792 B1 | 7/2004 | Askar | |
| 6,940,812 B1 | 9/2005 | Kaneko | |
| 7,613,788 B2 * | 11/2009 | Kaneko | 709/217 |

FOREIGN PATENT DOCUMENTS

| | | |
|---|---|---|
| JP | 11-41257 | 2/1999 |
| JP | 2000-92066 | 3/2000 |

OTHER PUBLICATIONS

T. Okutani et al.; A study on ATM Cell Assembling Method for Multi-Rate CBR Connections; Transactions of the Institute of Electronics, Information and Communication Engineers; vol. 93, No. 72, pp. 13-18 and English Abstract.

Co-pending U.S. Appl. No. 11/102,870, filed Apr. 11, 2005, Michio Kaneko, entitled "Apparatus and Method for Data Transmission", 33 pages.

* cited by examiner

APPARATUS AND METHOD FOR DATA TRANSMISSION

RELATED APPLICATIONS

This application is a continuation of U.S. patent application Ser. No. 11/102,870 filed Apr. 11, 2005 which is a continuation of U.S. patent application Ser. No. 09/576,324 filed May 22, 2000, now U.S. Pat. No. 6,940,812, the entire contents of which are incorporated by reference herein.

BACKGROUND OF THE INVENTION

The present invention relates to a data cell transmission apparatus. More particularly, the invention relates to an apparatus for transmitting data cells of constant bit rates.

In the conventional art of the field, various apparatuses for transmitting constant bit rate (CBR) data cells to an asynchronous transfer mode (ATM) network have been invented.

For example, a technology, has conventionally been presented to realize an adapter chip adapted to interface a variety of constant bit rate services to a central buffer data bus.

As another example, a CDV control method for CBR traffic has been presented. The CDV control method performs control in such a way as to limit cell delay fluctuation to a minimum, which occurs during passing through the ATM network, by providing a shaping FIFO in an output stage from an ATM switch to a terminal and storing a group of input CBR cells for a predetermined period of time.

However, in any of the foregoing technologies, no consideration is given to a case where concentration of accessing occurs in the data bus, causing a high load state thereof, when a number of data cells are transmitted. Head data cells need more time than data cells other than the head data cells to be processed. Therefore, if the head data cells are sent out through adjacent slots continuously, it causes that constant bit rates cannot be maintained. As a result, there is always a possibility that constant bit rates cannot be maintained because of the temporary high load state of the data bus.

SUMMARY OF THE INVENTION

The present invention was made in order to solve the foregoing problems inherent in the conventional art. An object of the invention is to provide a CBR data cell transmission apparatus, which is capable of reducing concentration of accessing loads on a data bus following data cell reading when a plurality of data cells are transmitted to an ATM network with CBR.

In accordance with a preferred embodiment, a transmission apparatus for constant bit rate data cells of the invention is adapted to transmit a group of data packets in sequence for respective constant bit rate data cells to an asynchronous transfer mode network, and comprises a controller. In this case, the controller performs in such a way as to inhibit data cells sent out respectively through continuous slots from being head data cells of the data packets.

In accordance with another preferred embodiment, a transmission apparatus for constant bit rate data cells of the invention is adapted to transmit a group of data packets in sequence for respective data cells of constant bit rates to an asynchronous transfer mode network in matching with a transmission cycle, and comprises a controller. In this case, the cell controller determines, when a new group of data packets is transmitted, whether or not a data cell sent out to the asynchronous transfer mode network through a slot immediately before has been a head data cell of the data packet, starts the transmission of the new group of data packets from a next transmission cycle if the data cell has been the head data cell, and starts the transmission of the new group of data packets to the asynchronous transfer mode network at the current transmission cycle if the data cell has not been the head data cell.

In accordance with yet another preferred embodiment, a transmission method for constant bit rate data cells of the invention comprises the steps of: reading bits of control information in a shaper link list in sequence through respective slots of a transmission cycle; transmitting data cells of constant bit rates in accordance with the control information; after completion of processing for all the pieces of control information in the shaper link list, linking control information linked to a head portion of an additional link list to a last of the shaper link list, and deleting the control information from the additional link list; determining whether or not a data cell sent out through a slot immediately before is a head data cell of the data packet; and transmitting the data cell based on the control information added to the shaper link list if the data cell sent out through the slot immediately before is not the head data cell of the data packet.

BRIEF DESCRIPTION OF THE DRAWINGS

These and other objects, features and advantages of the invention will become more fully apparent from the following detailed description taken in conjunction with accompanying drawings.

DESCRIPTION OF THE PREFERRED EMBODIMENTS

Now, description will be made in detail of the preferred embodiments of a transmission apparatus for constant bit rate data cells according to the present invention with reference to the accompanying drawings.

Figure 1:
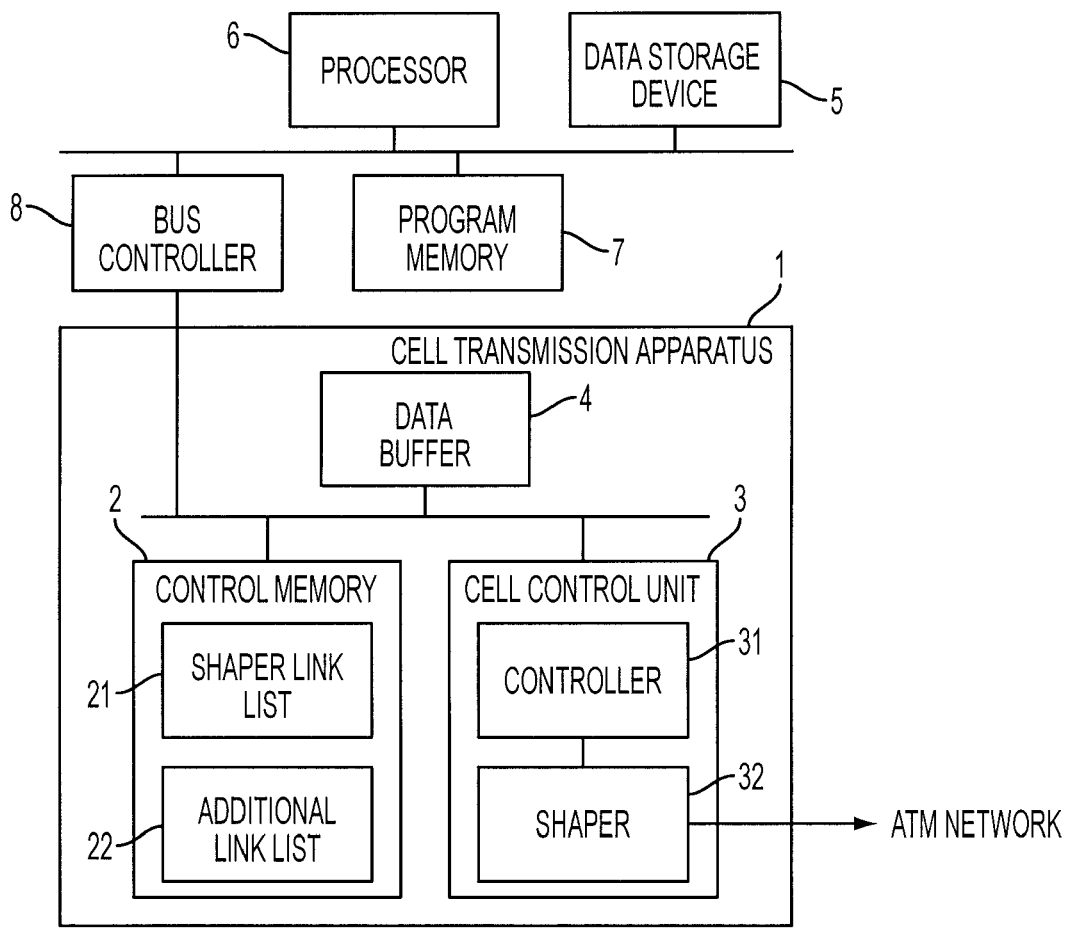
FIG. 1 is a block diagram showing a constitution of a preferred mode of the invention.

As shown in FIG. 1, a CBR data cell transmission apparatus 1 of the invention comprises: a control memory 2, a cell control unit 3; and a data buffer 4.

A data storage device 5 is provided as a storage region for storing a stream of data or the like to be outputted to an ATM network beforehand. In accordance with ATM Standard, each data cell has a size of 53 bytes: higher 5 bytes thereof constitute a header; and remaining lower 48 bytes constitute a data portion.

Figure 2B:
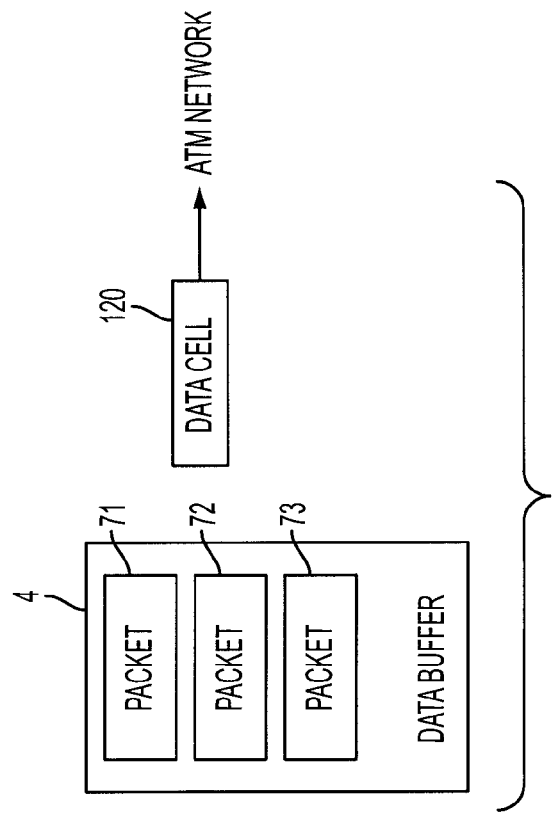
FIGS. 2a and 2b are views, each of which shows a data flow in the preferred mode of the invention.
Figure 2A:
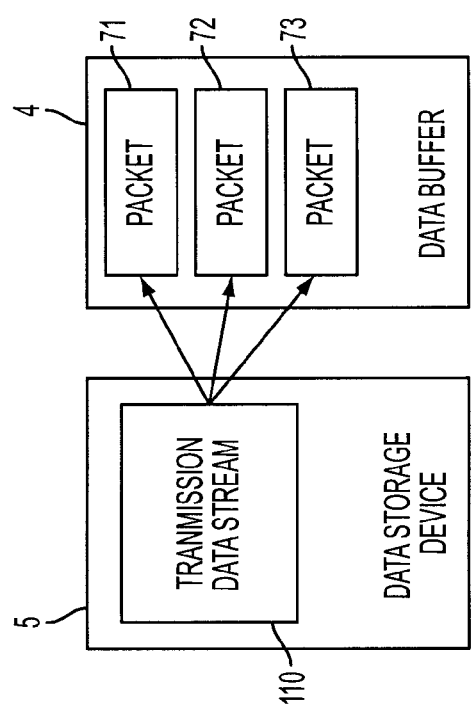

A processor 6 is provided to transfer a transmission data stream 110 stored in the data storage device 5 through a bus controller 8 to the data buffer 4. This transfer of the data stream 110 is carried out based on a program in a program memory 7 and by a fixed packet unit dependent on a page size of the memory, as shown in FIG. 2a. In addition, the processor 6 writes control information (referred to as Virtual Channel (VC) information, hereinafter), regarding transmission of the data stream, in the control memory 2 installed in the CBR data cell transmission apparatus 1.

Figure 3:
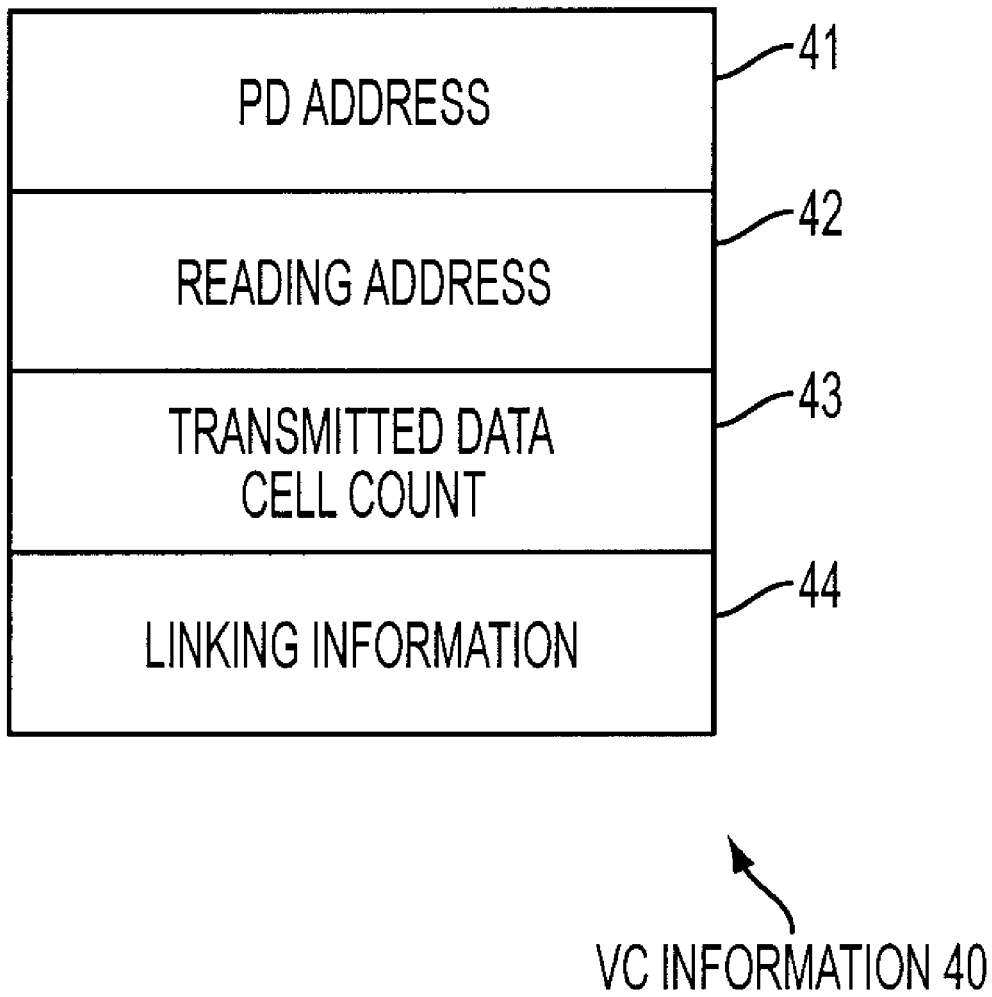
FIG. 3 is a view showing a structure of VC Information of the invention.

As shown in FIG. 3, VC information 40 contains a PD address 41 indicating a location of a Packet Descriptor (PD) on the data buffer 4, a reading address 42 indicating an address of a data cell to be read and to be transmitted next in a packet, a transmitted data cell count 43 indicating the number of transmitted data cells in the packet, and linkage information 44 indicating a linkage between preceding and succeeding pieces of VC information.

Hereupon, the PD is stored in the data buffer 4 corresponding to each VC information, and adapted to hold respective head addresses of a plurality of packets, into which a stream of data to be transmitted corresponding to the VC information being divided, in the order of data.

The control memory 2 stores a shaper link list 21 and an additional link list 22. The shaper link list 21 is provided as a list of VC information, where pieces of VC information regarding the stream of data to be transmitted are correlated (linked) with one another. The additional link list 22 is provided as an additional list of VC information, where new VC information to be added to the shaper link list 21 is linked.

The cell control unit 3 includes controller 31 and a shaper 32. The shaper 32 is provided to transfer a data cell with a preset CBR. The controller 31 carries out data transmission for the shaper 32 based on scheduling like that described below. Specifically, in matching with each slot of a transmission cycle for data transmission, the controller 31 reads pieces of VC information linked in the shaper link list 21 in sequence from a head portion thereof. Then, based on the read VC information, as shown in FIG. 2b, the controller 31 reads a data cell 120 of a constant bit rate from each of packets 71 to 73 held in the data buffer 4, and outputs the data cell 120 through the shaper 32 to the ATM network.

Also, the controller 31 subsequently reads head VC information contained in the additional link list 22 after reading last VC information contained in the shaper link list 21.

Hereupon, if there is no VC information in the additional link list 22, the controller 31 is placed on standby until a next transmission cycle arrives. After the arrival of the next transmission cycle, in matching with a slot, the controller 31 reads pieces of VC information in the shaper link list 21 again in sequence from a head portion thereof, and then carries out data cell transmission.

On the other hand, if there is VC information in the additional link list 22, the controller 31 links VC information, which has been added to the additional link list 22, with the last information of the shaper link list 21, and deletes the VC information from the additional link list 22. At this time, the controller 31 determines whether or not a data cell outputted from a slot immediately before reading of the added VC information is a head portion of a packet. If the data cell outputted from the slot immediately before the reading is not a head portion of the packet, then the controller 31 reads data equivalent to one data cell from the packet held in the data buffer 4 based on the added VC information, and then outputs the data to the ATM network through the shaper 32. Conversely, if the data cell outputted immediately before the reading is a head portion of the packet, then the controller 31 simply links the added VC information with the last information of the shaper link list 21 without reading any data from the data buffer 4 based on the added VC information, and then finishes its processing. After the completion of processing for the head VC information of the additional link list 22, the controller 31 is placed on standby until a next transmission cycle arrives.

Next, description will be made in detail of a first, embodiment of the invention by referring to the drawings. The first embodiment relates to a case where no VC information that is being transmitted exits in the shaper link list 21, and a VCa 51 is linked with the additional link list 22.

Figure 4:
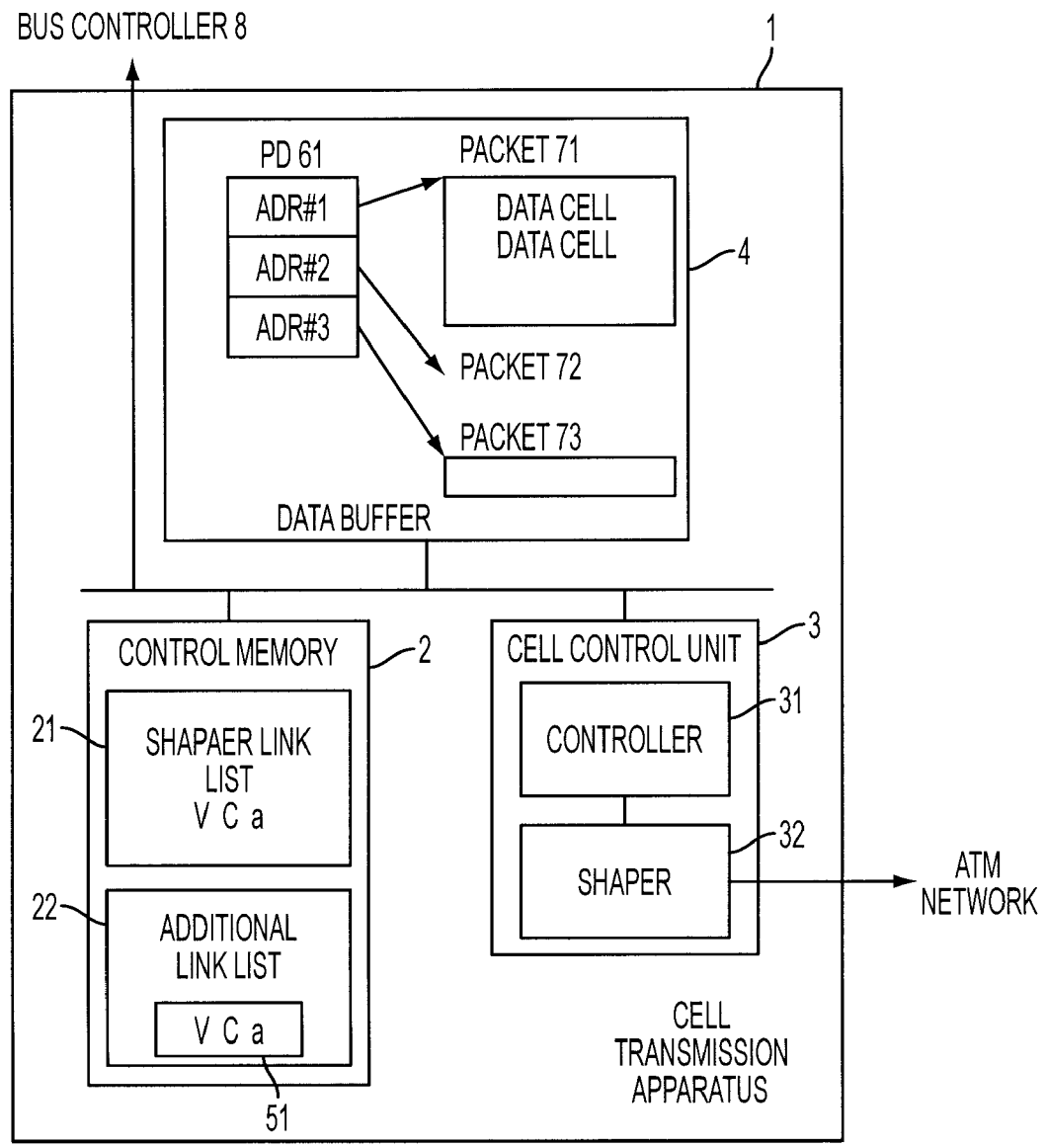
FIG. 4 is a view showing a first embodiment of the invention.

In FIGS. 1 and 4, first, the processor 6 transmits a stream of data stored to be transmitted in the data storage device 5 to the data buffer 4, the data being set as packets 71 to 73 respectively. Then, VC information (VCa 51) of this data stream is linked with the additional link list 22. The operation of the processor 6 for transferring the packets from the data storage device 5 to the data buffer 4 is carried out independently of an operation of the CBR data cell transmission apparatus 1.

A PD 61 is stored in the data buffer 4 corresponding to the VCa 51. The PD 61 sequentially holds respective head addresses (ADR #1 to ADR #3) of the packets 71 to 73 obtained by dividing the stream of data to be transmitted, and stores the order of packet data.

In the VCa 51, a head address of the PD 61 is stored as an initial value in the PD address 41, and "0" is stored in the transmitted data cell count 43.

In the CBR data cell transmission apparatus 1, after the arrival of a data transmission cycle, the controller 31 determines whether the shaper 32 is in a state ready for transmission or not. If the shaper 32 is in a state ready for transmission, then the controller 31 reads pieces of VC information linked with the shaper link list 21 in sequence from a head portion thereof, in matching with slots. In this case, since the shaper link list 21 is empty, the controller 31 performs reading from the additional link list 22, and reads the VCa 51 as head VC information linked therewith.

After the reading from the additional link list 22, the controller 31 first updates linkage information regarding the VCa 51, links the VCa 51 with the shaper link list 21, and deletes the VCa 51 from the additional link list 22. Subsequently, the controller 31 determines whether a data cell transmitted through a slot immediately before the reading is a head portion of the packet or not based on the transmitted data cell count 43 of the VC information read immediately before.

In this case, since there are no data cells which have been transmitted immediately before, the controller 31 determines no transmission of a head portion of the data cell through the slot immediately before the reading. After the determination of no transmission of a head portion of the data cell through the slot immediately before the reading, the controller 31 reads an address of the PD 61 indicated in the PD address 41 of the VCa 51. Then, the controller 31 reads out data equivalent to one data cell from the head of the packet 71 indicated by the ADR #1 of the PD 61, and outputs the data through the shaper 32 to the ATM network. After the outputting of the data, the controller 31 increases the transmitted data cell count 43 to "1", and updates the reading address 42 to an address of a data cell to be read next in the packet 71. Hereupon, if an increment from "0" to "1" is made in the transmitted data cell count 43, the controller 31 further updates the PD address 41 to an address indicating the ADR #2 of the PD 61, which holds a head address of the next packet 72.

After the completion of processing for the VCa 51, the controller 31 finishes its processing at the current transmission cycle, and then stands by until a next transmission cycle arrives.

Upon the arrival of the next transmission cycle, the controller 31 starts reading of pieces of VC information again in sequence from the head of the shaper link list 21, in matching with slots. Then, a head VCa 51 is first read from the shaper link list 21. Hereupon, since the transmitted data cell count 43 of the VCa 51 is not "0", the controller 31 determines transmission of a second round or after for the VCa 51, and sends out, to the ATM network, the data cell of the packet 71 indicated in the reading address 42 without referring to the PD address 41. After the sending-out of the data cell, the controller 31 updates the reading address 42 and the transmitted data cell count 43. In this case, since the transmitted data cell count 43 is updated to "2" (not to "1"), the controller 31 performs no updating for the PD address 41. Thereafter, data cell transfer operations are carried out for respective transmission cycles in sequence as in the case of the foregoing operation.

If the sent-out data cell is a last of the packet 71, then the controller 31 resets the transmitted data cell count 43 to "0" after the sending-out of the data cell. At a next cycle, upon having recognized that the transmitted data cell count 43 is "0", the controller 31 reads the ADR #2 of the PD 61 held in the PD address 41 to obtain a head address of the next packet 72, and sends out each data cell of the packet 72 as in the foregoing case.

Figure 5:
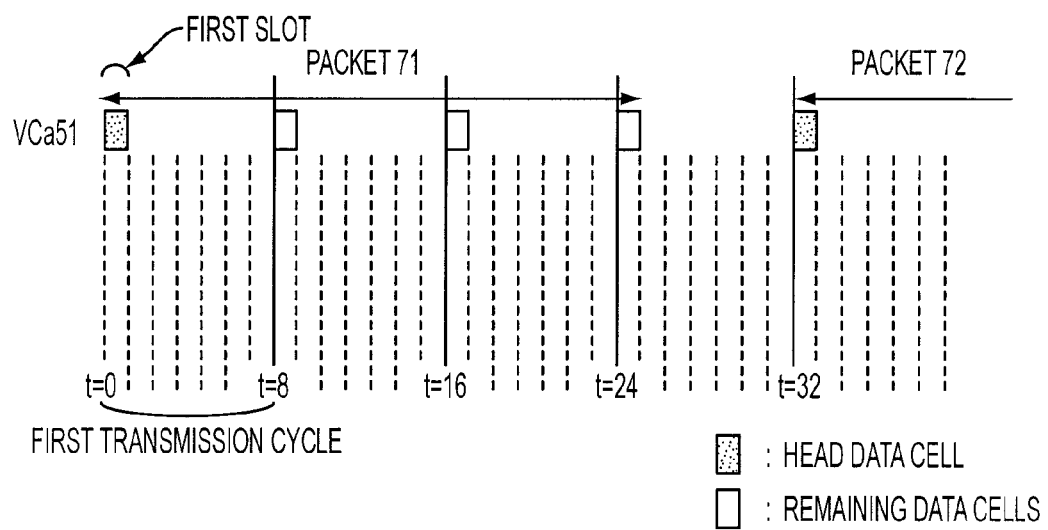
FIG. 5 is a flow chart showing an operation of the first embodiment of the invention.

A time chart of FIG. 5 shows that a slot of the transmission cycle of FIG. 4 is "8", and a transmission rate of the shaper 32 is "¼". In other words, the time chart shows setting where transmission of one packet is complete by 4 data cells. Specifically, for the VCa 51, the head data cell of the packet 71 thereof is sent out through the first slot (t=0) of a first transmission cycle. Thereafter, remaining data cells are sent out through the first slots (t=8, 16 and 24) of respective transmission cycles, and transmission of one packet is completed. Through the first slot (t=32) of a fifth transmission cycle, a head data cell of the next packet 72 is sent out.

Figure 6:
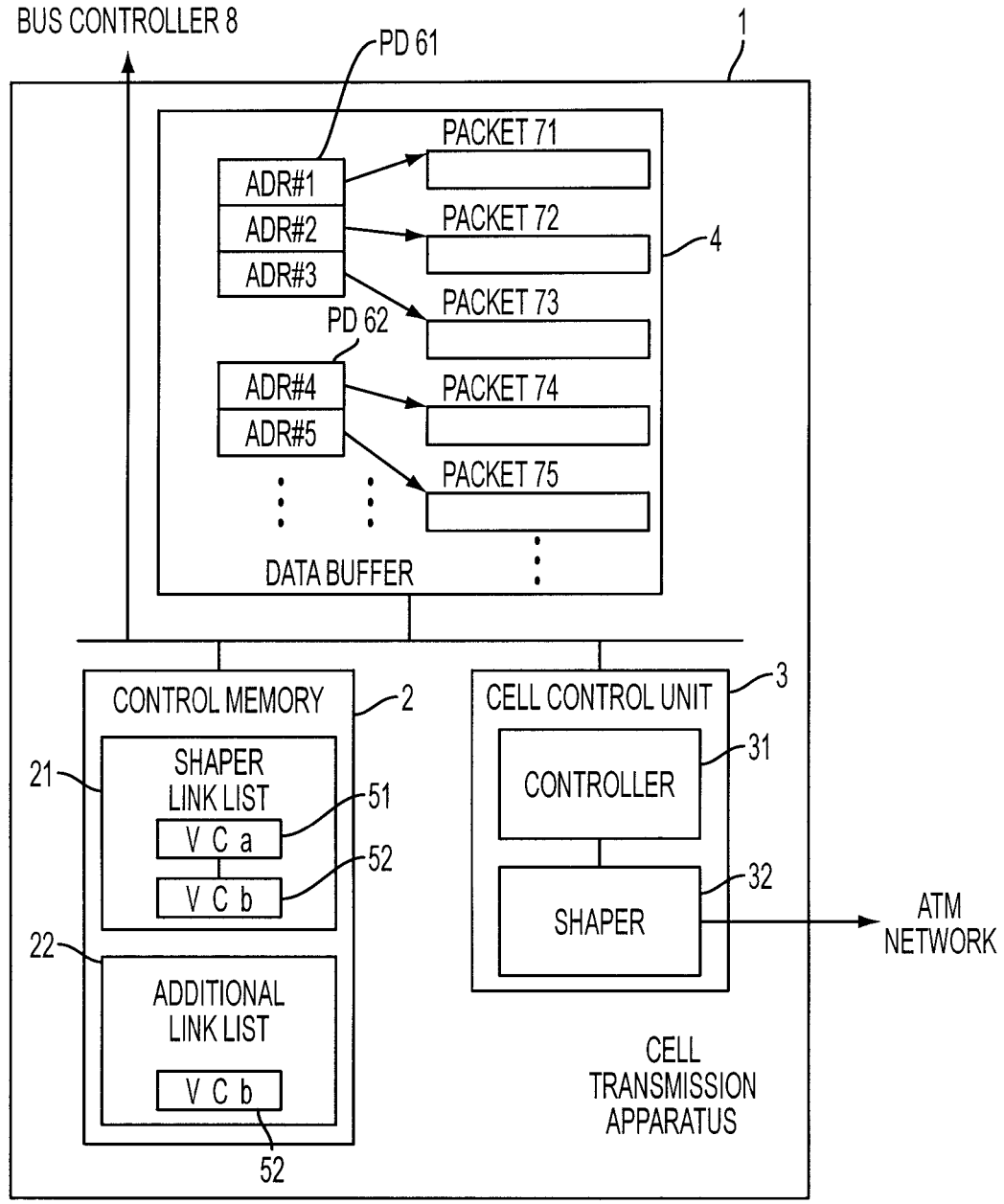
FIG. 6 is a view showing a second embodiment of the invention.
Figure 7A:
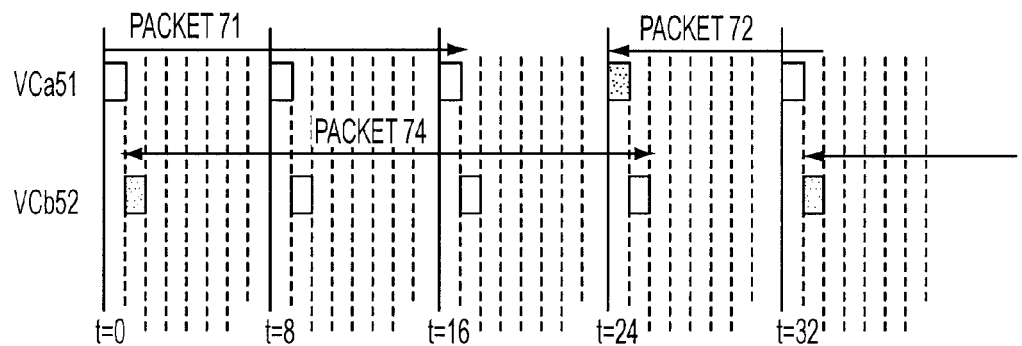
FIGS. 7a and 7b are flow charts, each of which shows an operation of the second embodiment of the invention.
Figure 7B:
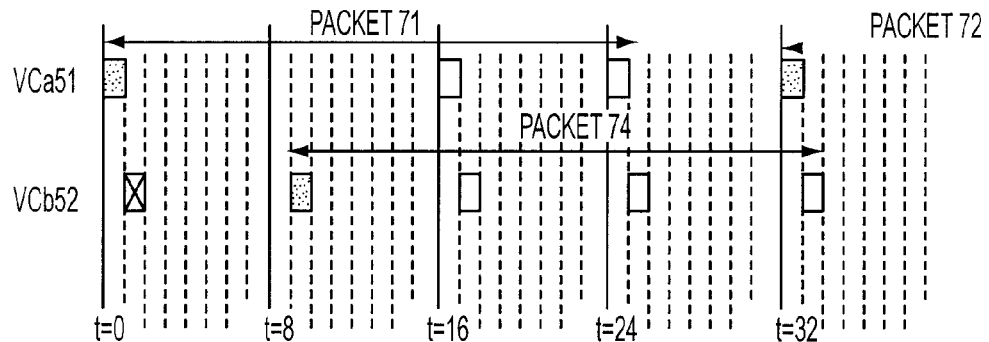

Next, description will be made of a second embodiment of the invention. The second embodiment relates to a case where a VCb 52 is linked with the additional link list while a VCa 51 that is being transmitted exits in the shaper link list 21. In FIGS. 6 and 7, after the transmission cycle has been set, the controller 31 reads, out the VCa 51 in the shaper link list 21 through a first slot (t=0) and sends out a data cell (see t=0 in FIGS. 7a and 7b).

Next, the controller 31 reads the VCb 52 from an additional link list 22 through a second slot (t=1). First, the controller 31 updates respective pieces of linkage information 44 regarding the VCa 51 and the VCb 52, adds the VCb 52 to the shaper link list 21, and deletes the VCb 52 from the additional link list 22. Hereupon, the controller 31 determines whether the data cell sent out through the slot immediately before has been a head of the packet or not based on the transmitted data cell count 43 of the VCa 51 processed through the slot immediately before.

If the transmitted data cell count 43 of the VCa 51 is other than "1", then, the controller 31 determines the data cell of the VCa 51 sent out through the first slot immediately before as one other than a head of each of the packets 71 to 73. In this case, as shown in FIG. 7a, the controller 31 reads an ADR #4 of a PD 62 indicated by a PD address 41 of the VCb 52 through the second slot (t=1) to obtain a head address of a packet 74, and then outputs a head data cell of the packet 74 through the shaper 32 to the ATM network. Thereafter, the controller 31 updates a reading address 42 of the VCb 52, increases the transmitted data cell count 43 to "1", and updates the PD address 41 to an address indicating an ADR #5 of the PD 62, which holds a head address of a next packet.

On the other hand, if the transmitted data cell count 43 of the VCa 51 is "1", then, the controller 31 determines the data cell of the VCa 51 sent out through the first slot immediately before as a head data cell of the packet. In this case, as shown in FIG. 7b, the controller 31 simply adds the VCb 52 through the second slot (t=1) to the shaper link list 21, and finishes its processing for the VCb 52 without sending out the data cell thereof. After a subsequent second transmission cycle has been set, the controller 31 reads the VCa 51 through the first slot (t=8), sends out the data cell thereof, and then updates the transmitted data cell count 43 of the VCa 51 to "2". The controller 31 reads the VCb 52 through a subsequent second slot (t=9), and verifies that the transmitted data cell count 43 of the VCa 51 processed through the first slot immediately before is not "1". After having verified that the transmitted data cell count 43 of the VCa 51 is not "1", the controller 31 reads the ADR #4 of the PD 62 indicated by the PD address 41 of the VCb 52 to obtain a head address of the packet 74, and then outputs a head data cell of the packet 74 through the shaper 32 to the ATM network.

The foregoing operation prevents the head data cells of the packets from being sent out through the continuous slots of the transmission cycle. Accordingly, continuous reading of the PD 61 and the PD 62 can be prevented, and it is therefore possible to avoid the inability of maintaining a constant bit rate due to a temporary high load state set by PD reading.

Next, description will be made of a third embodiment of the invention. The third embodiment relates to a case where a VCa 51 that is being transmitted exists in the shaper link list 21, and plural bits of VC information (VCb 52 ad VCc 53) are linked with the additional link list 22.

Figure 8:
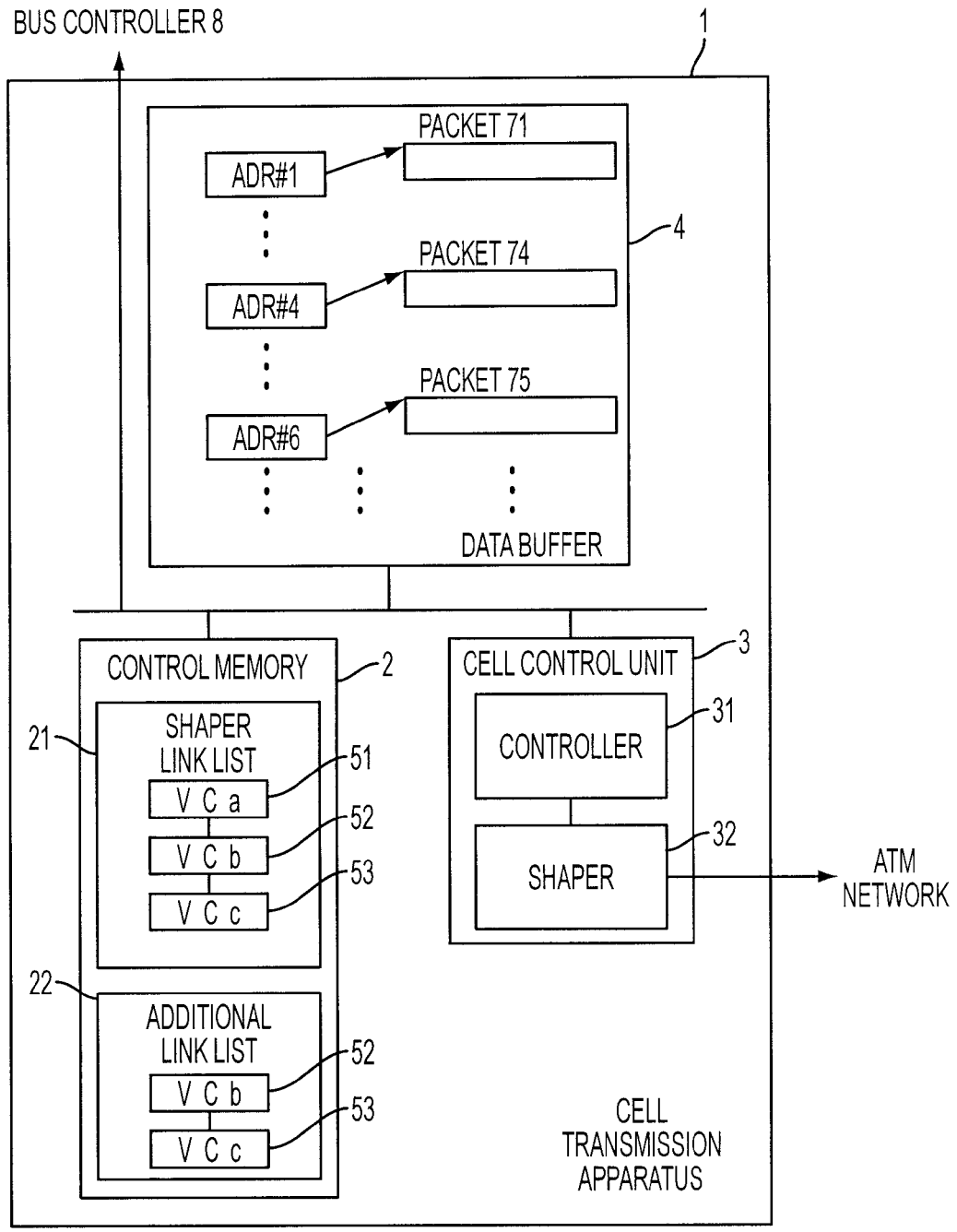
FIG. 8 is a view showing a third embodiment of the invention.

As shown in FIG. 8, the controller 31 performs processing for the VCa 51 and the VCb 52, which is similar to each of those described above. The VCa 51 and the VCb 52 are thus placed in a linked state with the shaper list link 21.

Figure 9A:
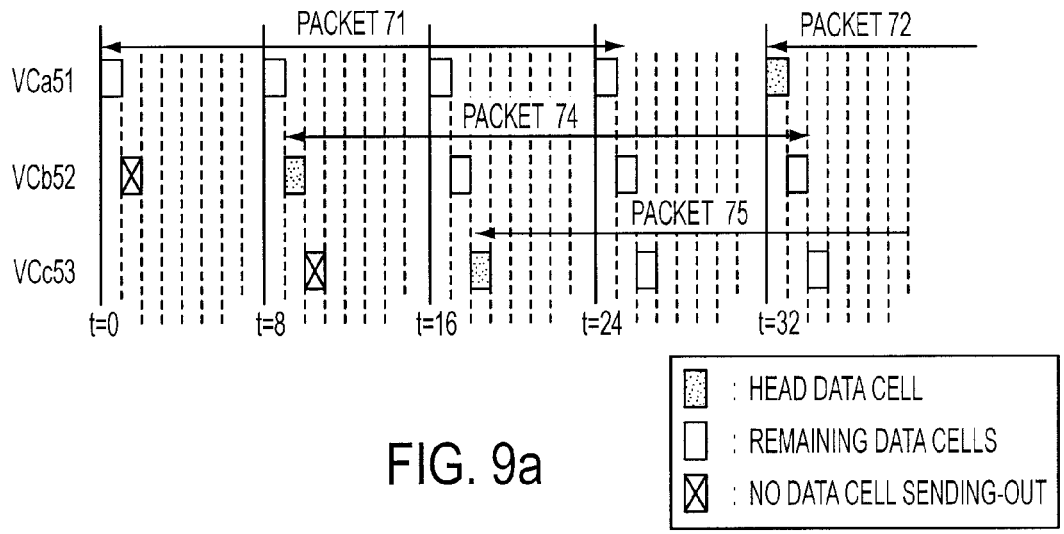
FIGS. 9a and 9b are flow charts, each of which shows an operation of the third embodiment of the invention.
Figure 9B:
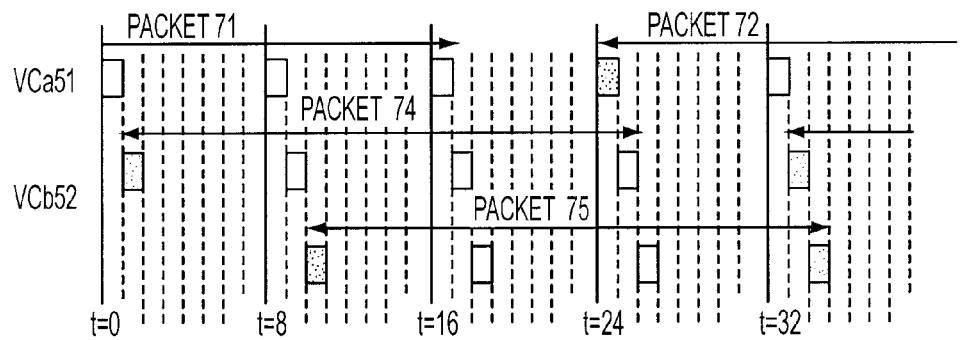

Through the second slot of the first transmission cycle (t=1), the controller 31 performs processing for the VCb 52. At the end time of the processing through the second slot, a state of t=2 shown in FIG. 9a or 9b is set. That is, a state (FIG. 9a) is set, where the VCb 52 is only added to the shaper link list 21, and no data cell sending-out is performed for the VCb 52. Alternatively, a state (FIG. 9b) is set, where the transmitted data cell count 43 of the VCb 52 is "1". In the case of the state shown in FIG. 9a, where no data cell transmission is performed for the VCb 52, processing stands by for the VCc 53 until the end of processing for the VCb 52, and data cell sending-out never occurs for the VCc 53. In the case of the state shown in FIG. 9b, where data cell sending-out never occurs for the subsequent VCc 53, since the transmitted data cell count 43 of the VCb 52 is "1". It can therefore be understood that if plural pieces of VC information are added to the additional link list 22, other than the head VC information VCb 52, no data cell transmission occurs at the first transmission cycle (t=0 to 7). Accordingly, the controller 31 reads only the head VC information from the additional link list 22, and then finishes the processing at the first transmission cycle.

At the subsequent second transmission cycle (t=8 to 15), in the state of FIG. 9a, the transmitted data cell count 43 of the VCb 52 is "1" at the second slot (t=9). The VCc 53 is only added through a third slot (t=10) to the shaper link list 21, and further data cell sending-out is withheld. On the other hand, in the case of FIG. 9b, the transmitted data cell count 43 of the VCb 52 is "2" at the second slot (t=9). The VCc 53 is added through the third slot (t=10) to the shaper link list 21, and a head data cell of a packet 76 is sent out.

Next, description will be made of a processing operation of the controller 31 according to the invention by referring to the drawing.

Figure 10:
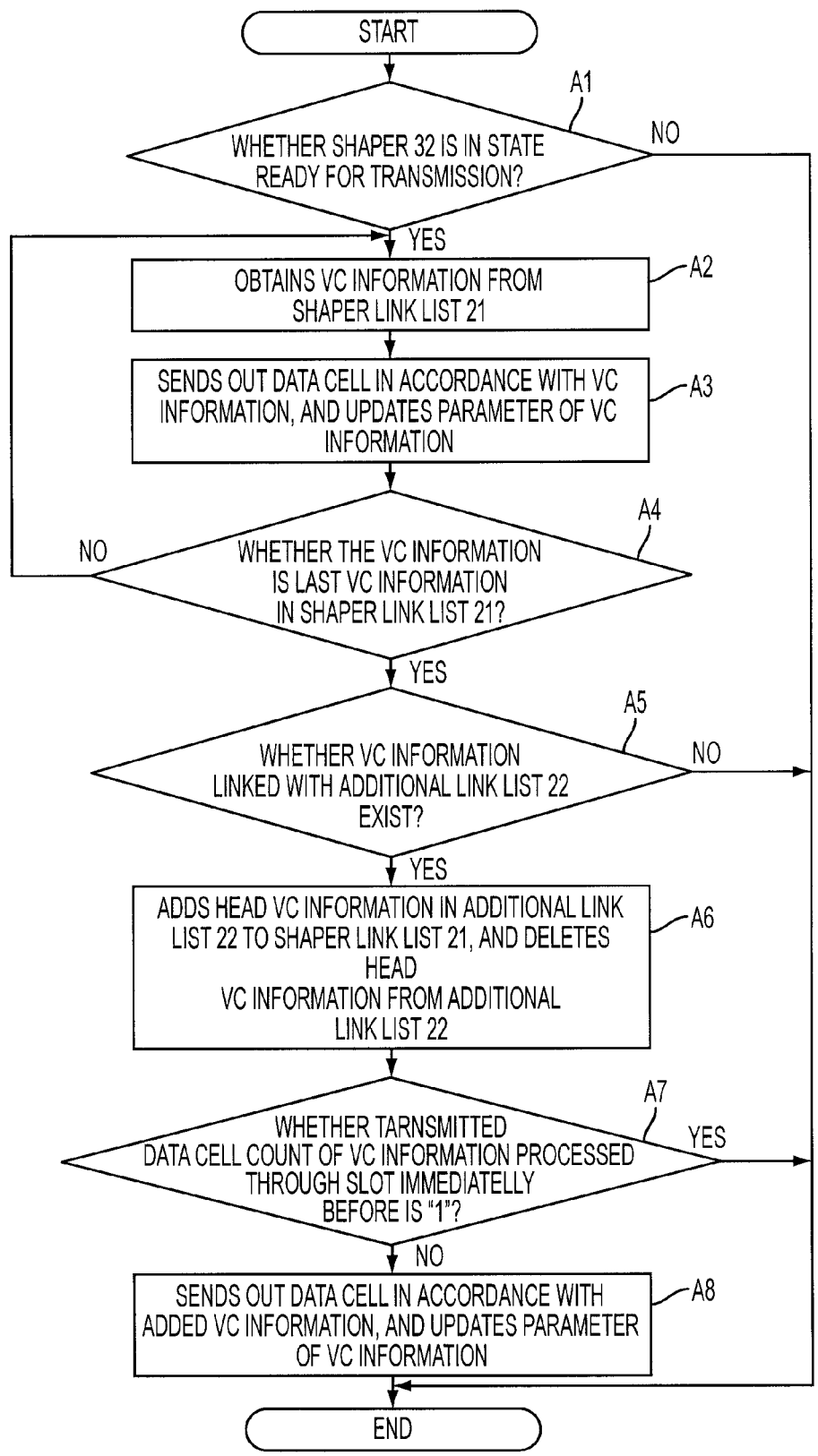
FIG. 10 is a flow chart showing an operation of controller 31 of the invention.

In FIG. 10, after the arrival of a transmission cycle, the controller 31 determines whether the shaper 32 is in a state ready for transmission or not (step A1). If the shaper 32 is not in the state ready for transmission, then the controller 32 stands by until a next transmission cycle arrives. On the other hand, if the state ready for transmission is determined, then the controller 31 reads VC information from the link list of the shaper link list 21 (step A2), sends out a data cell in accordance with the read VC information, and updates a parameter of the VC information (step A3). Hereupon, the controller 31 determines whether the VC information is last VC information or not in the shaper link list 21 (step A4). If it is not the last VC information, the controller 31 then reads next VC information in accordance with linkage information 44 (to step A2). If the VC information is the last VC information in the shaper link list 21, the controller 31 then determines whether VC information linked with the additional link list 22 exits or not (step A5). If there is no VC information in the additional link list 22, the controller 31 finishes its processing at this transmission cycle, and stands by until a next transmission cycle arrives. On the other hand, if there is VC information in the additional link list 22, the controller 31 adds and links head VC information in the additional link list 22 with the last of the shaper link list 21, and deletes the VC information from the additional link list 22 (step A6). Subsequently, the controller 31 refers to the transmitted data cell count of the VC information processed through the slot immediately before, and determines whether the processing through the slot immediately before has been transmission of a head data cell of the packet or not, the transmission being accompanied by PD reading (step A7). If the processing through the slot immediately before has been transmission of the head data cell of the packet, then, the controller 31 finishes its processing at this transmission cycle, and stands by until a next transmission cycle arrives. On the other hand, if the processing through the slot immediately before has been transmission of other than the head data cell of the packet, which is not accompanied by PD reading, then, the controller 31 reads a PD address 41 of the VC information added to the last, sends out a head data cell of the packet indicated by the PD, and updates each parameter for VC information (step A8) After the completion of the updating, the controller 31 finishes its processing at this transmission cycle, and stands by until a next transmission cycle arrives.

Figure 11:
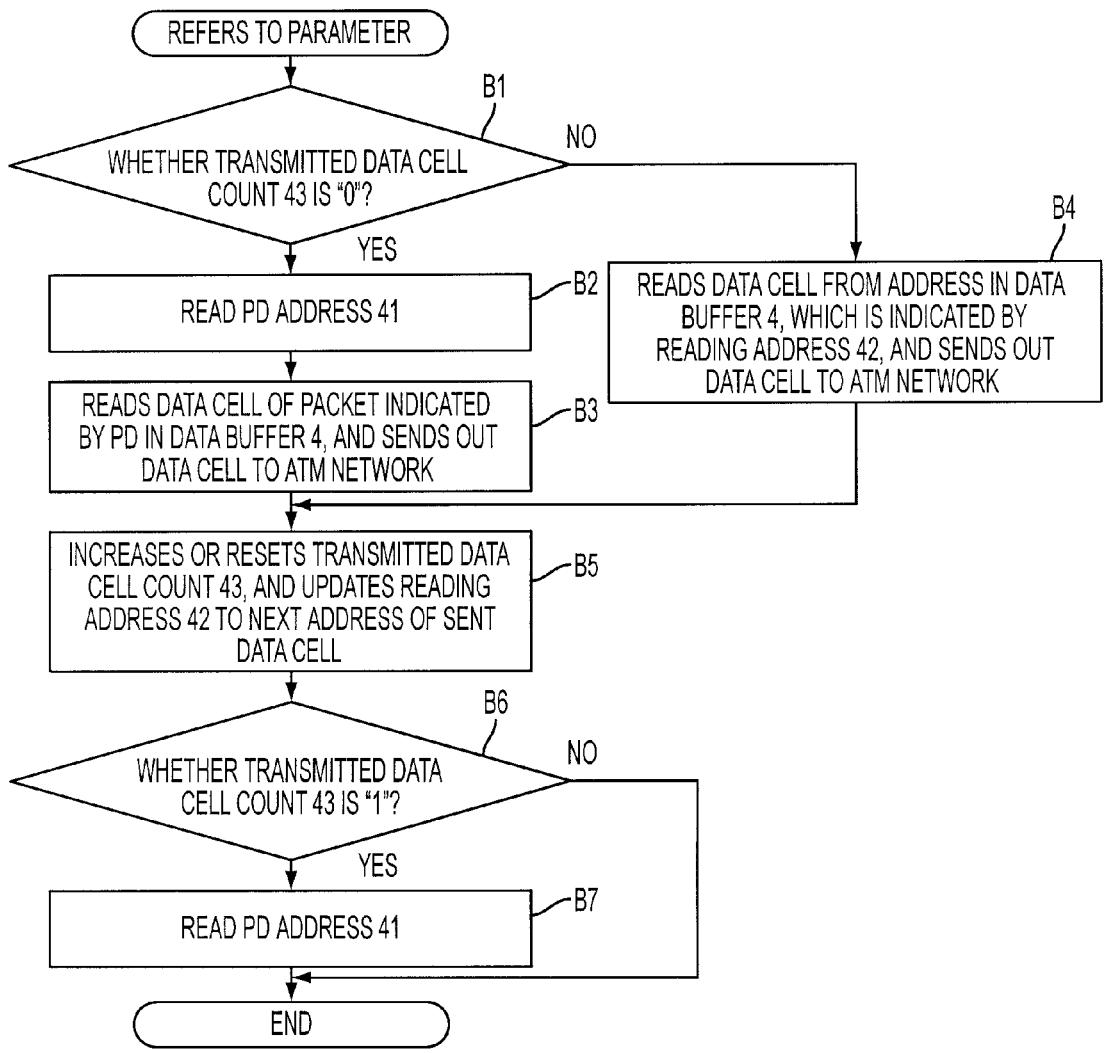
FIG. 11 is a flow chart showing a processing operation for VC information of the controller 31 of the invention.

Next, in FIG. 11, description will be made in detail of the processing operation of the VC information performed by the controller 31 in step A3. After reading one VC information from the shaper link list 21, the controller 31 first refers to the transmitted data cell count 43 of the read VC information, and determines whether the transmitted data cell count 43 is "0" or not (step B1). If the transmitted data cell count 43 is "0", then, the controller 31 reads a PD address 41 (step B2) The controller 31 refers to a PD existing in the data buffer 4, which is indicated by the PD address 41, and reads a head date cell of the packet indicated by the PD and then sends out the head data cell to the ATM network (step B3). On the other hand, if the transmitted data cell count 43 is other than "0", then, the controller 31 reads a subsequent data cell of the packet being transmitted, based on an address in the data buffer 4, which is indicated by the reading address 42, and sends out the data cell to the ATM network (step B4). After the sending-out of the data cell, the controller 31 increases or resets the transmitted data cell count 43, and updates the reading address 42 to a next address of the sent data cell (step B5). After the updating, the controller 31 refers to the transmitted data cell count 43, and determines whether the transmitted data cell count 43 is "1" or not (step B6). If the transmitted data cell count 43 is "1", then, the controller 31 updates the PD address 41 (step B7), and moves to the processing of step A4. If the transmitted data cell count 43 is other than "1", the controller 31 moves to the processing of step A4 without updating the PD address 41.

As described in the foregoing, with the embodiment of the invention, in the case of transmitting a plurality of data streams of constant bit rates to the ATM network, the controller 31 performs control in such a manner that transmission of a subsequent data stream to be sent out cannot be started immediately after the head cell being transmitted, and this transmission of the subsequent data stream can be started at the time of next scheduling. In this way, the head cells are prevented from being sent out continuously through adjacent slots. As a result, concentration of accessing loads on the data buffer 4 can be reduced.

As apparent from the foregoing, the invention is advantageous for reducing transmission rate fluctuation of CBR data cells in the transmitting side, which is achieved by moderating local concentration of accessing loads on the data buffer during data cell reading, and providing sufficient time for a data cell reading operation with respect to a data cell transmission timing.

Although the preferred embodiments of the present invention have been described in detail, it should be understood that various changes, substitutions and alternations can be made therein without departing from spirit and scope of the inventions as defined by the appended claims.

What is claimed is:

1. A network device comprising:
   a controller to:
      determine whether a first header of a first data packet is transmitted from the network device in a first time slot in a transmission cycle,
      determine that a second header of a second data packet, that is different from the first header is to be transmitted from the network device in a second time slot of the transmission cycle, the second time slot being adjacent to the first time slot in the transmission cycle,
      transmit the second header from the network device in the second time slot when the first header is not transmitted in the first time slot, and
      delay a transmission of the second header to a subsequent transmission cycle when the first header is transmitted from the network device in the first time slot of the transmission cycle.

2. The network device of claim 1, where the controller is further to:
   store, in a memory associated with the network device, a data stream to be transmitted from the network device,
      where the data stream is divided into the first data packet and the second data packet, the first data packet comprising the first header and a first data portion and the second data packet comprising the second header and a second data portion, and
      where the first data packet and the second data packet are each to be transmitted sequentially as a plurality of data cells.

3. The network device of claim 2, where the controller is further to:
   prior to transmitting the first header, identify the first header and the first data portion of the first data packet, and identify the second header and the second data portion of the second data packet.

4. The network device of claim 1, where the controller is further to:
transmit the first header of the first data packet from the network device in the first time slot of the transmission cycle when data transmitted from the network device immediately prior to the first header being read comprises a data portion of a third data packet.

5. The network device of claim 1, where the controller is further to:
transmit the first header of the first data packet from the network device in a second time slot of the subsequent transmission cycle when the first header is transmitted from the network device in the first time slot of the transmission cycle.

6. The network device of claim 1, where, when delaying the transmission of the second header of the second data packet, the controller is further to:
determine a transmission of a last portion of the first data packet from the network device, and
delay the transmission of the second header of the second data packet from the network device until after the transmission of the last portion of the first data packet from the network device.

7. The network device of claim 1, where, when determining whether the first header of the first data packet is transmitted from the network device in the first time slot, the controller is further to:
determine whether a counter associated with the first data packet comprises a particular value, and
determine that the first header of the first data packet is transmitted from the network device when the counter comprises the particular value.

8. A non-transitory computer-readable medium comprising:
one or more instructions which, when executed by a processor of a network device, cause the processor to determine whether a first header portion of a first data packet is transmitted from the network device in a first slot of a transmission cycle;
one or more instructions which, when executed by the processor of the network device, cause the processor to determine that a second header portion of a second data packet, that is different from the first header portion, is to be transmitted from the network device in a second slot of the transmission cycle that is adjacent to the first slot in the transmission cycle;
one or more instructions which, when executed by the processor, cause the processor to transmit the second header portion from the network device in the second slot when the first header portion is not transmitted in the first slot; and
one or more instructions which, when executed by the processor, cause the processor to delay a transmission of the second header portion to a slot of a subsequent transmission cycle when the first header portion of the first data packet is transmitted from the network device in the first slot of the transmission cycle.

9. The non-transitory computer-readable medium of claim 8, where the instructions further comprise:
one or more instructions to store the data stream in a data buffer portion of a memory associated with the network device.

10. The non-transitory computer-readable medium of claim 8, where the instructions further comprise:
one or more instructions to determine that the second data packet is entirely outputted to the network; and
where the one or more instructions to delay the transmission of the second header portion to the slot of the subsequent transmission cycle, further comprise:
one or more instructions to delay transmitting the second header portion of the second data packet until after the network device determines that the first data packet is entirely outputted to the network.

11. The non-transitory computer-readable medium of claim 8, the instructions further comprising:
one or more instructions to determine whether the first header portion or a first non-header portion of the first data packet is to be transmitted from the slot of the transmission cycle; and
one or more instructions to determine whether a header portion or a non-header portion of a third data packet is to be transmitted from the network device immediately prior to the data of the first data packet being read, the data of the first data packet being transmitted in the first time slot of the first transmission cycle when the non-header portion of the third data packet is transmitted from the network device immediately prior to the data of the first data packet being read.

12. The non-transitory computer-readable medium of claim 8, where the one or more instructions which, when executed by the processor, cause the processor to determine whether the first header portion of the first data packet is transmitted from the network device in the first slot of the transmission cycle include:
one or more instructions which, when executed by the processor, cause the processor to:
determine whether a counter associated with the first data packet comprises a particular value, and
determine that the first header portion of the first data packet is transmitted from the network device when the counter comprises the particular value.

13. A method comprising:
transmitting, by a network device and immediately prior to reading data of a second data packet from a memory of the network device, data of a first data packet in a first time slot of a first transmission cycle;
determining, by the network device, whether the transmission of the data of the first data packet satisfies a first condition associated with the transmission of the first data packet;
determining, by the network device, whether the data of the second data packet, that is to be transmitted in a second time slot of the first transmission cycle, satisfies a second condition, the second time slot immediately following the first time slot in the first transmission cycle and the second condition corresponding to the transmission of the data of the second data packet;
transmitting, by the network device, the data of the second data packet in the second time slot of the first transmission cycle when the data of the first data packet does not satisfy the first condition or the data of the second data packet does not satisfy the second condition; and
transmitting, by the network device, the data of the second data packet in a time slot of a second transmission cycle when the data of the first data packet satisfies the first condition and the data of the second data packet satisfies the second condition.

14. The method of claim 13, further comprising:
preventing, by the network device, a transmission of the data of the second data packet in the second time slot of the first transmission cycle when the data of the first data packet satisfies the first condition and the data of second the data packet satisfies the second condition.

15. The method of claim 13, where the first condition is satisfied when the data of the first data packet comprises a header portion of the first data packet and the second condition is satisfied when the data of the second data packet comprises a header portion of the second data packet.

16. The method of claim 13, further comprising:
transmitting, by the network device, the data of the second data packet after transmission of a last portion of the first data packet when the data of the first data packet does not satisfy the first condition or the data of the second data packet does not satisfy the second condition.

17. The method of claim 13, further comprising:
transmitting, by the network device, a last portion of the first data packet in a first time slot of the second transmission cycle; and
transmitting, by the network device, the data of the second data packet in a time slot of another transmission cycle when the data of the first data packet satisfies the first condition and the data of the second data packet satisfies the second condition, the other transmission cycle beginning after the transmission of the last portion of the first data packet.

18. The method of claim 13, further comprising:
incrementing, based on transmitting the data of the first data packet, a counter; and
where determining whether the transmission of the data of the first data packet satisfies the first condition includes:
determining whether the incremented counter comprises a particular value, the transmission of the data of the first data packet satisfying the first condition when the incremented counter comprises the particular value.

\* \* \* \* \*

UNITED STATES PATENT AND TRADEMARK OFFICE
CERTIFICATE OF CORRECTION

PATENT NO. : 8,352,571 B2
APPLICATION NO. : 12/551342
DATED : January 8, 2013
INVENTOR(S) : Michio Kaneko Page 1 of 1

It is certified that error appears in the above-identified patent and that said Letters Patent is hereby corrected as shown below:

Column 8, claim 1, line 40 should read: "that is different from the first header, is to be transmit-"

Signed and Sealed this
Nineteenth Day of February, 2013

Teresa Stanek Rea
*Acting Director of the United States Patent and Trademark Office*